(12) United States Patent
Jung

(10) Patent No.: US 10,408,303 B2
(45) Date of Patent: Sep. 10, 2019

(54) INTEGRATED OPERATING APPARATUS AND SYSTEM FOR WINDOW GLASS AND DOOR CURTAIN

(71) Applicant: HYUNDAI MOTOR COMPANY, Seoul (KR)

(72) Inventor: Ok-Tae Jung, Seocho-gu (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 400 days.

(21) Appl. No.: 15/370,172

(22) Filed: Dec. 6, 2016

(65) Prior Publication Data
US 2018/0119777 A1  May 3, 2018

(30) Foreign Application Priority Data

Oct. 27, 2016  (KR) .................. 10-2016-0141067

(51) Int. Cl.
| | |
|---|---|
| E05F 15/603 | (2015.01) |
| F16H 1/22 | (2006.01) |
| F16H 19/06 | (2006.01) |
| F16H 57/039 | (2012.01) |
| E05F 15/697 | (2015.01) |

(52) U.S. Cl.
CPC ........... *F16H 1/222* (2013.01); *E05F 15/603* (2015.01); *E05F 15/697* (2015.01); *F16H 19/06* (2013.01); *F16H 57/039* (2013.01)

(58) Field of Classification Search
CPC . B60J 1/20; B60J 1/2011; B60J 1/2016; B60J 1/2019; B60J 1/2025
See application file for complete search history.

(56) References Cited

U.S. PATENT DOCUMENTS

| | | | |
|---|---|---|---|
| 4,980,591 A | 12/1990 | Takanashi et al. | |
| 7,891,730 B2* | 2/2011 | Rikkert | B60J 7/0573 296/220.01 |
| 8,439,433 B2* | 5/2013 | Kim | B60J 7/0573 296/214 |
| 8,915,021 B2* | 12/2014 | Han | E06B 9/50 49/142 |

(Continued)

FOREIGN PATENT DOCUMENTS

| | | |
|---|---|---|
| JP | H09-137673 A | 5/1997 |
| JP | 2003063244 A | 3/2003 |
| JP | 2015047922 A | 3/2015 |

(Continued)

*Primary Examiner* — Patrick J Maestri
(74) *Attorney, Agent, or Firm* — McDonnell Boehnen Hulbert & Berghoff LLP

(57) ABSTRACT

An integrated operating apparatus for a window glass and a door curtain may include a housing, a drive motor installed in the housing, a window glass operating gear, a window glass operating wire for operating the window glass wound around the window glass operating gear, a door curtain operating gear spaced apart from the window glass operating gear, a door curtain operating wire wound around the door curtain operating gear, a clutch gear meshed with the drive motor and slidable to be alternatively meshed with any one of the window glass operating gear and the door curtain operating gear, and a gear changer allowing the clutch gear to be meshed with any one of the window glass operating gear and the door curtain operating gear.

18 Claims, 5 Drawing Sheets

(56) References Cited

U.S. PATENT DOCUMENTS

2017/0122022 A1* 5/2017 Kim ................... E05F 15/643

FOREIGN PATENT DOCUMENTS

| KR | 20010098822 A | 11/2001 |
| KR | 100529182 B1 | 11/2005 |
| KR | 20060020763 A | 3/2006 |
| KR | 20080014632 A | 2/2008 |
| KR | 20130033127 A | 4/2013 |
| KR | 20140074590 A | 6/2014 |

* cited by examiner

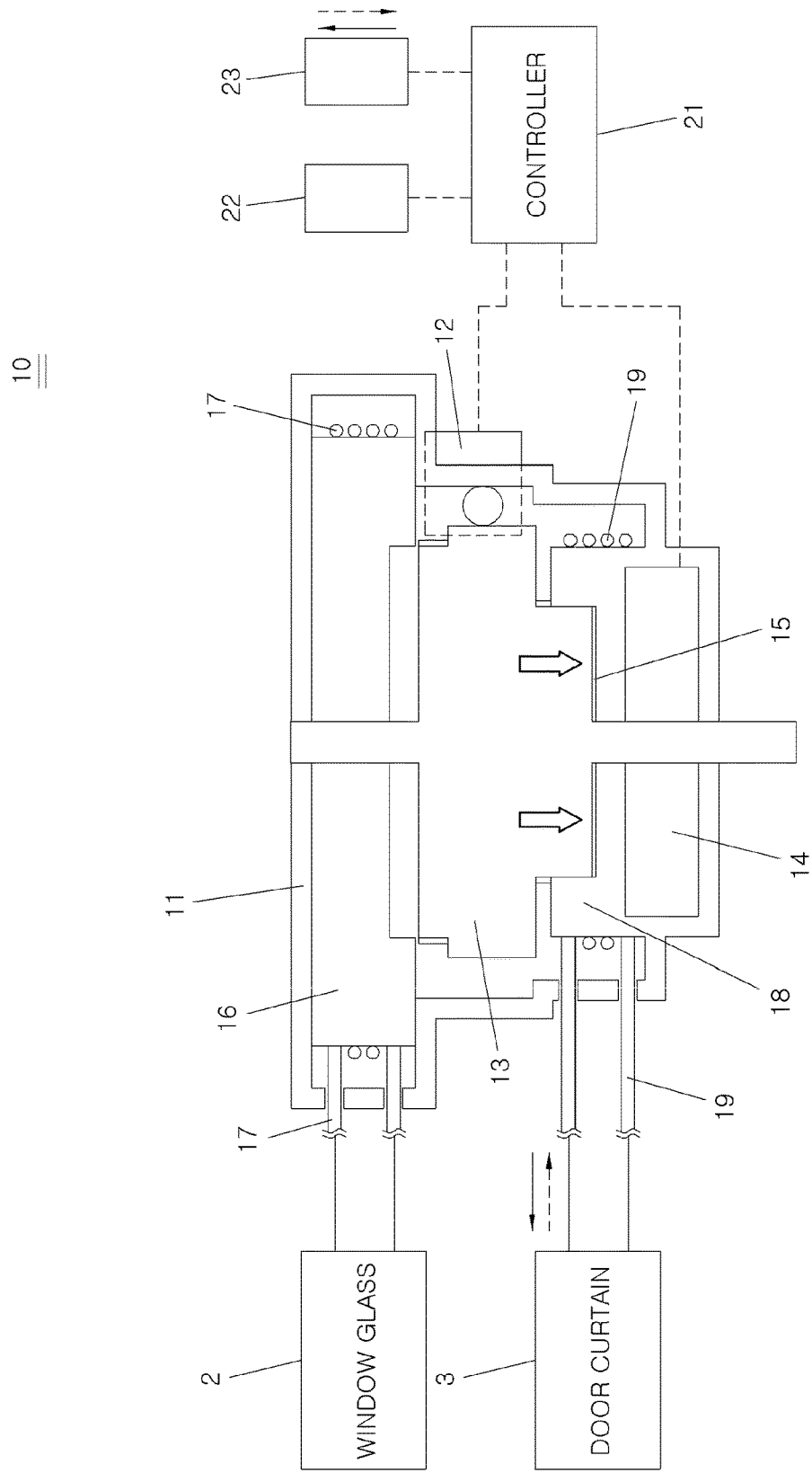

INTEGRATED OPERATING APPARATUS AND SYSTEM FOR WINDOW GLASS AND DOOR CURTAIN

CROSS-REFERENCE TO RELATED APPLICATIONS

This application claims the benefit of and priority to Korean Patent Application No. 10-2016-0141067, filed on Oct. 27, 2016, which is incorporated herein by reference in its entirety.

BACKGROUND OF THE INVENTION

Field of the Invention

Example embodiments of the present disclosure relate to an apparatus for operating a window glass and a door curtain, and more particularly, to an integrated operating apparatus for a window glass and a door curtain capable of selecting and operating any one of the window glass and the door curtain by one apparatus, and an operating system for a window glass and a door curtain using the apparatus.

Description of Related Art

Vehicle doors include a window glass for allowing an outside view from inside of the vehicle or allowing the vehicle to receive light from the outside. The window glass may generally be received into the door, and opens and closes a portion of the door based on operation of an operation switch.

Door curtains have recently been introduced for the purpose of blocking sunlight or providing privacy protection, primarily in more expensive vehicles.

According to the related art, as shown in FIG. 1, a window glass drive motor 111 for operating a window glass 2 and a door curtain drive motor 121 for operating a door curtain 3 are separately installed.

In a case of the window glass 2, when a passenger operates a window glass operation switch 114, the window glass drive motor 111 activates, and a driving force generated by the window glass drive motor 111 is transferred through a window glass driving force transfer part 112 to operate a window glass operating wire 113, thereby raising and lowering window glass 2.

Similarly, in the case of the door curtain 3, when the passenger operates a door curtain operation switch 124, the door curtain drive motor 121 activates, and a driving force generated by the door curtain drive motor 121 is transferred through a door curtain driving force transfer part 122 to operate a door curtain operating wire 123, thereby operating door curtain 3.

However, in the related art, the need for two separate operating apparatuses is problematic as it is difficult to secure the appropriate amount of space with the narrow space between an inside door panel and an outside door panel.

Further, because the window glass drive motor 111 and the door curtain drive motor 121 need to be separately installed, the number of components is increased, thereby increase the cost and weight of the vehicle.

SUMMARY OF THE INVENTION

An example embodiment according to the present disclosure provides an integrated operating apparatus for a window glass and a door curtain capable of selectively operating the window glass and the door curtain using a single motor, and an operating system for a window glass and a door curtain using the example operating apparatus.

Other objects and advantages of the present disclosure can be understood by the following description, and become apparent with reference to the described example embodiments. Also, it is obvious to those skilled in the art to which the present disclosure pertains that the objects and advantages of the present invention can be realized by the means as claimed and combinations thereof.

In accordance with an embodiment of the present invention, an integrated operating apparatus for a window glass and a door curtain includes: a housing, a drive motor installed in the housing, a window glass operating gear, a window glass operating wire for operating the window glass wound around the window glass operating gear, a door curtain operating gear spaced apart from the window glass operating gear, a door curtain operating wire wound around the door curtain operating gear, a clutch gear meshed with the drive motor and slidable to be alternatively meshed with any one of the window glass operating gear and the door curtain operating gear, and a gear changer allowing the clutch gear to be meshed with any one of the window glass operating gear and the door curtain operating gear.

The gear changer may include an elastic member that elastically supports the clutch gear and allows it to be meshed with any one of the window glass operating gear and the door curtain operating gear.

The gear changer may further include an electromagnet that moves the clutch gear in a direction opposite to the direction in which the elastic force of the elastic member is applied.

The elastic member may elastically support the clutch gear so that the clutch gear is meshed with the door curtain operating gear.

When power is applied to the electromagnet, the electromagnet may operate the clutch gear so that the clutch gear is meshed with the window glass operating gear.

The elastic member may elastically support the clutch gear so that the clutch gear is meshed with the window glass operating gear.

When power is applied to the electromagnet, the electromagnet may operate the clutch gear so that the clutch gear is meshed with the door curtain operating gear.

The attraction force generated by magnetization of the electromagnet and that moves the clutch gear may be greater than the elastic force by which the elastic member elastically supports the clutch gear.

The clutch gear may be composed of a magnetic metal.

A worm gear may be installed on an output shaft of the drive motor. The clutch gear may have teeth along its circumference that mesh with teeth on the worm gear, so that the worm gear and the clutch gear are constantly meshed with each other.

In accordance with another embodiment of the present disclosure, an operating system for a window glass and a door curtain that are installed in a door of a vehicle, comprises (i) an integrated operating apparatus for a window glass and a door curtain an integrated operating apparatus for a window glass and a door curtain including a housing, a drive motor installed in the housing; a window glass operating gear installed in the housing, a window glass operating wire wound around the window glass operating gear, a door curtain operating gear installed in the housing and spaced apart from the window glass operating gear, a door curtain operating wire wound around the door curtain operating gear, a clutch gear meshed with the drive motor and slidable to be alternatively meshed with one of the window glass operating gear and the door curtain operating gear; and a gear changer allowing the clutch gear to be meshed with any one of the window glass operating gear and the door curtain operating gear; (ii) a window glass operation switch operable by a passenger; (iii) a door curtain operation switch operable by a passenger; and (iv) a controller that applies power to the gear changer and applies power to the drive motor based on an input signal received from the window glass operation switch or the door curtain operation switch. In a further example embodiment, the selection means may comprise an electromagnet.

When the elastic member elastically supports the clutch gear so that the clutch gear is meshed with the door curtain operating gear, and an input signal is received by the controller from the window glass operation switch, the controller magnetizes the electromagnet, allowing the clutch gear to be meshed with the window glass operating gear, and then rotates the drive motor.

When the elastic member elastically supports the clutch gear so that the clutch gear is meshed with the door curtain operating gear, and an input signal is received by the controller from the door curtain operation switch, the controller does not magnetize the electromagnet but rotates the drive motor.

When the elastic member elastically supports the clutch gear so that the clutch gear is meshed with the window glass operating gear, and an input signal is received by the controller from the door curtain operation switch, the controller magnetizes the electromagnet, allowing the clutch gear to be meshed with the door curtain operating gear, and then rotates the drive motor.

When the elastic member elastically supports the clutch gear so that the clutch gear is meshed with the window glass operating gear, and an input signal is received by the controller from the window glass operation switch, the controller does not magnetize the electromagnet but rotates the drive motor.

The window glass operation switch may be operable in a plurality of directions, and the controller may determine a rotational direction of the drive motor based on an operating direction of the window glass operation switch.

The door curtain operation switch may be operable in a plurality of directions, and the controller may determine a rotational direction of the drive motor based on an operating direction of the door curtain operation switch.

BRIEF DESCRIPTION OF THE DRAWINGS

FIG. 5 is a cross-sectional view illustrating an example embodiment of an integrated operating apparatus for a window glass and a door curtain.

DESCRIPTION OF SPECIFIC EMBODIMENTS

Figure 1:
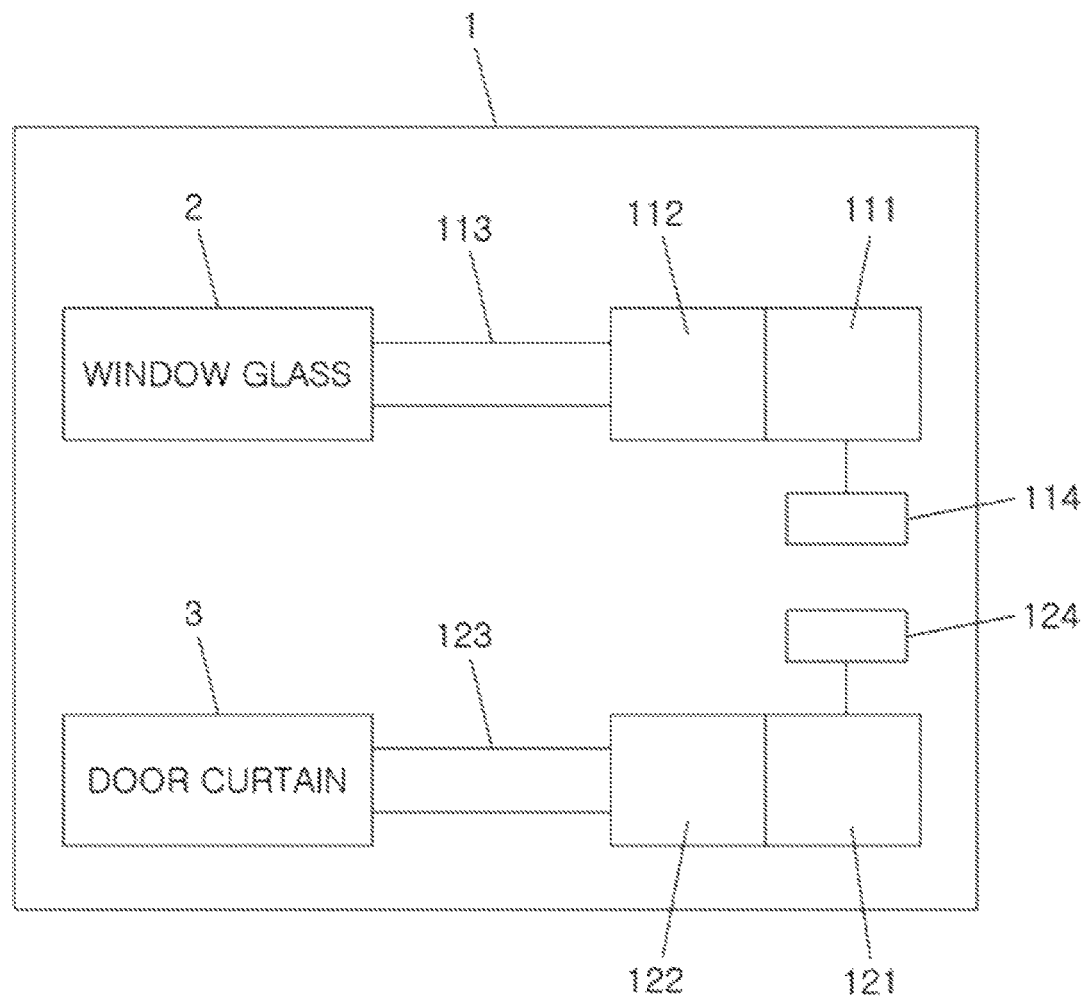
FIG. 1 is a block diagram illustrating a configuration for operating a window glass and a door curtain according to the related art.

Hereinafter, example embodiments of an integrated operating apparatus for a window glass and a door curtain are described in detail with reference to the accompanying drawings.

An example embodiment of an integrated operating apparatus for a window glass and a door curtain comprises: a housing 11; a drive motor 12 installed in housing 11; a window glass operating gear 16; a window glass operating wire 17 wound around window glass operating gear 16; a door curtain operating gear 18 spaced apart from window glass operating gear; a door curtain operating wire 19 wound around door curtain operating gear 18; a clutch gear 13 meshed with drive motor 12 and slidable to be alternately meshed with any one of window glass operating gear 16 and door curtain operating gear 18, and a gear changer configured to allow clutch gear 13 to be meshed with any one of window glass operating gear 16 and door curtain operating gear 18.

Housing 11 comprises a space therein and respective components for operating window glass 2 and door curtain 3 are installed in the space. Housing 11 is installed in a door of a vehicle.

Drive motor 12 is installed at one side of housing 11. When power is applied, drive motor 12 rotate to generate a driving force required to operate window glass 2 or door curtain 3.

Clutch gear 13 is rotatably installed in the housing 11. Clutch gear 13 is meshed with drive motor 12 and the driving force generated by drive motor 12 is input to clutch gear 13. In a further example embodiment, a worm gear having teeth around a circumference (not numbered) is installed on an output shaft of drive motor 12. Clutch gear 13 further comprises teeth around a circumference to mesh with the teeth around the circumference of the worm gear, allowing the driving force of drive motor 12 to be input to clutch gear 13. Clutch gear 13 is meshed with the worm gear installed on the output shaft of drive motor 12 at all times.

Clutch gear 13 serves to alternatively transfer the driving force input from the drive motor 12 to any one of window glass 2 and door curtain 3. To this end, clutch gear 13 is slidably installed in housing 11 in an axial direction.

Window glass operating gear 16 is rotatably installed in housing 11. Window glass operating gear 16 may be selectively meshed with clutch gear 13, to allow operation of window glass 2. Clutch gear 13 and window glass operating gear 16 may be meshed with each other. The clutch gear 13 have teeth of gear along a circumference of one side of the clutch gear 13, and the window glass operating gear 16 have teeth of gear on the inside of the window glass operating gear 16. The teeth of the clutch gear 13 is inscribed to the teeth of the window glass operating gear 16, while being meshed therewith on the window glass operating gear 16.

Window glass operating wire 17 for operating window glass 2 is wound around the outside of window glass operating gear 16. Window glass 2 may be raised and lowered based on the direction of rotation of window glass operating gear 16. Operating a window glass 2 by using a window glass operating wire 17 is a known technology, and thus a detailed description therefor will be omitted.

Door curtain operating gear 18 is rotatably installed in housing 11 and is spaced apart from window glass operating gear 16. Door curtain operating gear 18 may be selectively meshed with clutch gear 13; thus when clutch gear 13 and door curtain operating gear 18 are meshed with each other, door curtain 3 is operated.

Clutch gear 13 and door curtain operating gear 18 may be meshed with each other. The clutch gear 13 have teeth of gear along a circumference of the other side of the clutch gear 13, and the door curtain operating gear 18 have teeth of gear on the inside of the door curtain operating gear 18. The teeth of the clutch gear 13 is inscribed to the teeth of the door curtain operating gear 18, while being meshed therewith on the door curtain operating gear 18.

Door curtain operating wire 19 for operating door curtain 3 is wound around the outside of door curtain operating gear 18, such that the door curtain 3 is unfolded or folded based on the direction of rotation of window glass operating gear 18. Operating a door curtain 3 by using a door curtain operating wire 19 is a known technology, thus a detailed description therefor will be omitted.

In a configuration where window glass operating gear 16 and door curtain operating gear 18 are spaced apart from each other and clutch gear 13 is installed between window glass operating gear 16 and door curtain operating gear 18, clutch gear 13 may be alternatively meshed with one of the window glass operating gear 16 and the door curtain operating gear 18, such that the window glass operating gear 16 and the door curtain operating gear 18 may be operated by a single drive motor 12. Clutch gear 13 is positioned between the window glass operating gear 16 and the door curtain operating gear 18, which are spaced apart from each other, and can mesh with any one of window glass operating gear 16 and door curtain operating gear 18, thereby alternately operating window glass operating gear 16 or door curtain operating gear 18, respectively.

Gear changer allows clutch gear 13 to be alternately meshed with any one of window glass operating gear 16 and door curtain operating gear 18.

Figure 2:
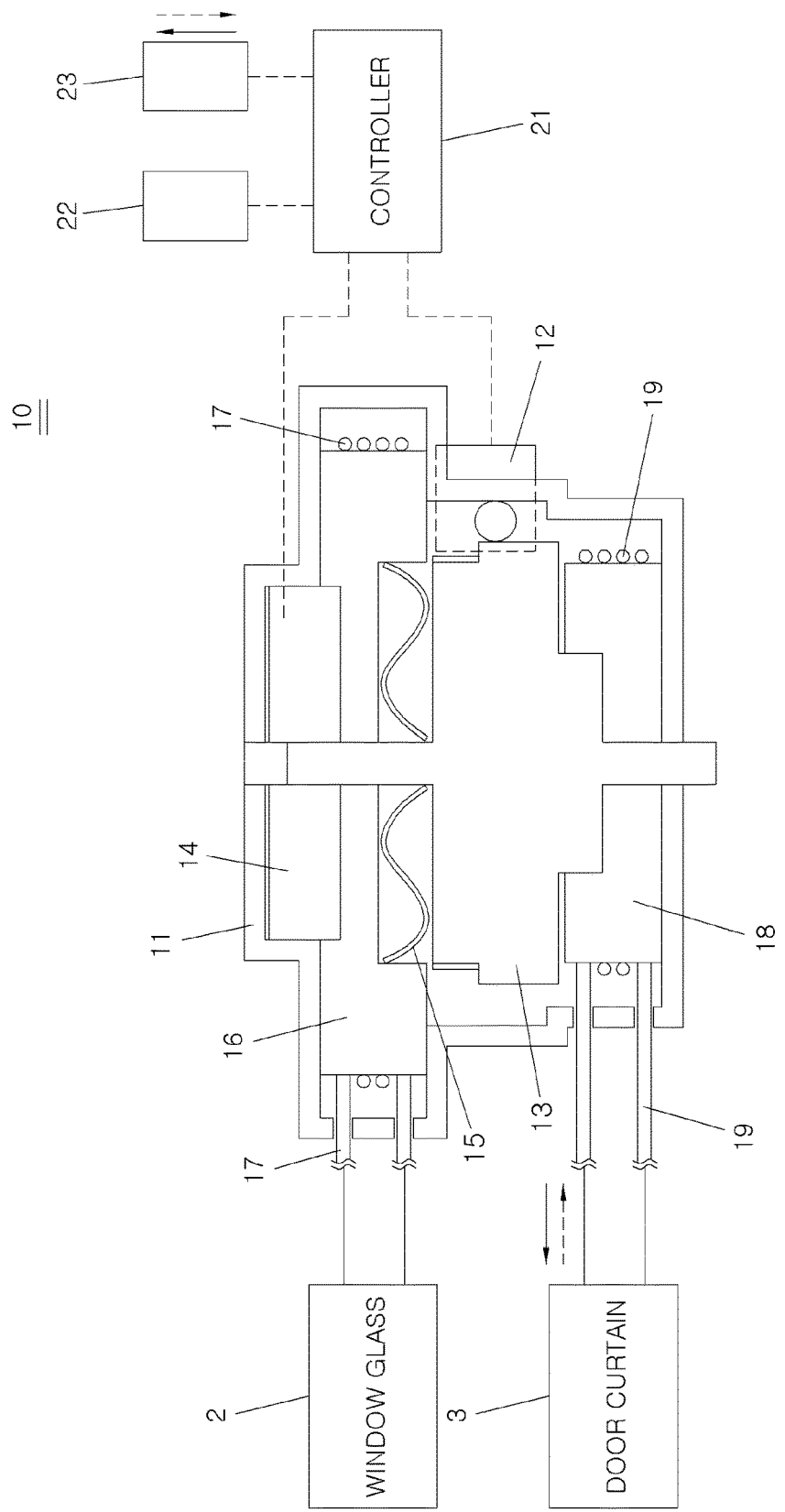
FIG. 2 is a cross-sectional view illustrating an example embodiment of an integrated operating apparatus for a window glass and a door curtain.
Figure 3:
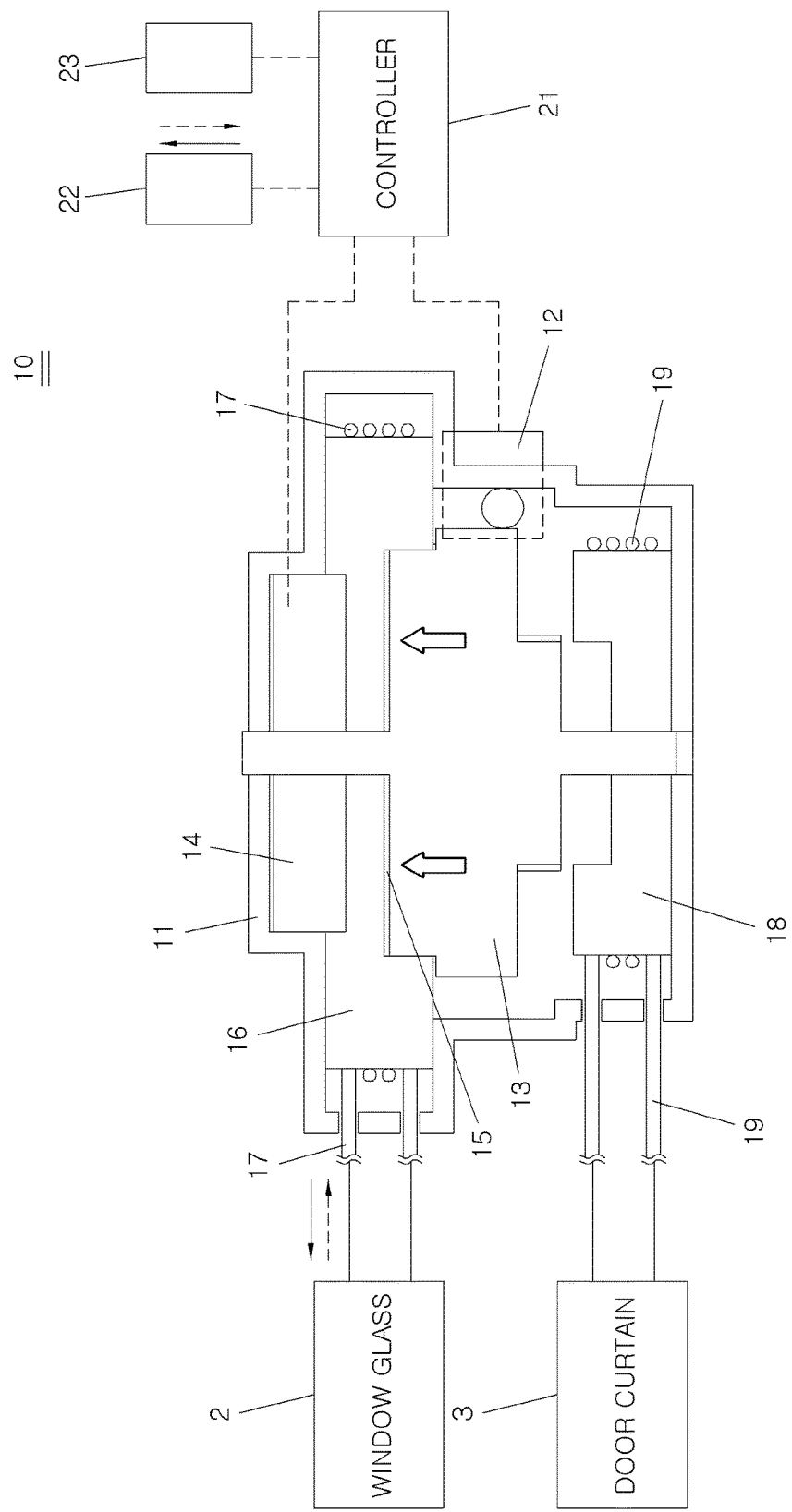
FIG. 3 is a cross-sectional view illustrating operation of a door curtain using an example embodiment of an integrated operating apparatus for a window glass and a door curtain.

In an example embodiment, gear changer may comprise an electromagnet 14 and an elastic member 15 as illustrated in FIGS. 2 and 3.

Electromagnet 14 slides a clutch gear 13 made of magnetic metal in the axial direction of clutch gear 13. Because clutch gear 13 is made of magnetic metal, when power is applied to electromagnet 14, clutch gear 13 is pulled toward electromagnet 14 and meshed with one of window glass operating gear 16 and door curtain operating gear 18.

Elastic member 15 allows clutch gear 13 to be meshed with one of window glass operating gear 16 and door curtain operating gear 18 when power is not applied to electromagnet 14. Operation of electromagnet 14 and elastic member 15 is described in greater detail below.

According to an example embodiment, elastic member 15 is installed between window glass operating gear 16 and clutch gear 12 to elastically support clutch gear 13 so that clutch gear 13 is meshed with door curtain operating gear 18. Electromagnet 14 is installed between window glass operating gear 16 and the housing 11. As shown in FIG. 2, when power has not been supplied to electromagnet 14, the force from elastic member 15 presses clutch gear 13 away from window glass operating gear 16 and towards door curtain operating gear 18, causing clutch gear 13 to mesh with door curtain operating gear 18.

Elastic member 15 may be any structure that elastically supports clutch gear 13 and allows it to be meshed with one of window glass operating gear 16 and door curtain operating gear 18. For example, elastic member 15 may be a wave spring as illustrated in FIGS. 2 and 3. The wave spring is bent in a wave form along a circumferential direction to elastically support clutch gear 13 and force it towards door curtain operating gear 18 when no external force is applied. When power is applied to electromagnet 14, the wave spring is flattened between window glass operating gear 16 and clutch gear 13 and clutch gear 13 moves to mesh with window glass operating gear 16.

In an additional example embodiment, elastic member 15 may be a coil spring.

When power is applied to electromagnet 14, the attraction force generated by magnetization of the electromagnet 14 exceeds the elastic force of elastic member 15, and thus clutch gear 13 moves towards electromagnet 14.

An operating system for a window glass and a door curtain using an example embodiment of the integrated operating apparatus for a window glass and a door curtain is also described below, and includes the above-described integrated operating apparatus for a window glass and a door curtain.

An example embodiment of an operating system for a window glass and a door curtain in accordance with the present disclosure comprises: the integrated operating apparatus for a window glass and a door curtain; a window glass operation switch 22 operable by a passenger; a door curtain operation switch 23 operable by a passenger; and a controller 21 that applies power to electromagnet 14 of the integrated operating apparatus 10 as needed and applies power to drive motor 12 of the integrated operating apparatus 10 based on an input signal received from window glass operation switch 22 or door curtain operation switch 23.

Window glass operation switch 22 is a switch operable by the passenger to operate the window glass 2 and is installed on the interior side of the vehicle door. Window glass operation switch 22 may be operated in at least two modes to raise and lower window glass 2.

Door curtain operation switch 23 is a switch operable by the passenger to operate the door curtain of the door and is installed on the interior side of the vehicle door. The door curtain operation switch 23 may be operated to unfold or fold the door curtain.

Controller 21 receives a signal generated by operation of window glass operation switch 22 or door curtain operation switch 23. Based on the input signal, controller 21 determines whether to magnetize electromagnet 14, and magnetizes the electromagnet 14 if magnetization is required. Controller 21 also determines the operating rotational direction of drive motor 12 so that drive motor 12 rotates in the direction appropriate to accomplish the desired task (e.g. raising or lowering the window).

Controller 21 determines whether to magnetize the electromagnet 14 based on whether there is a need to change the position of clutch gear 13, i.e. if the gear with which clutch gear 13 is meshed need not change based on the input signal, then the controller determines that electromagnet need not be magnetized.

Controller 21 also determines the rotational direction of drive motor 12 necessary to achieve a specific result based on the input signal received from window glass operation switch 22 and door curtain operation switch 23 that are operated by the passenger. The rotational direction of drive motor 12 when raising window glass 2 should be opposite to that when lowering window glass 2; similarly, the rotational direction of drive motor 12 when unfolding door curtain 3 should be opposite to that when folding door curtain 3.

Once controller 21 determines whether to magnetize the electromagnet 14 and determines the rotational direction of drive motor 12, power may be applied to the electromagnet 14 and the drive motor 12. When controller 21 determines that electromagnet 14 needs to be magnetized, power is applied to electromagnet 14, and clutch gear 13 moves toward electromagnet 14, thereby change the gear with which clutch gear 13 is meshed. Controller 21 allows a rotational force generated by drive motor 12 to be transferred to the one of window glass operating gear 16 and door curtain operating gear 18 that is meshed with clutch gear 13.

When two input signals are sent at approximately the same time from the window glass operation switch 22 and the door curtain operation switch 23, controller 21 ignores the later-received signal. Thus, when the drive motor 12 is operating one of the window glass 2 or door curtain 3, the other one may not be operated.

Operation of the integrated operating apparatus for a window glass and a door curtain and the operating system for a window glass and a door curtain having the configurations described above is described in detail below.

FIG. 2 illustrates an initial state, that is, a state in which power is not applied to electromagnet 14. In this state, electromagnet 14 is not magnetized, and clutch gear 13 is meshed with door curtain operating gear 18 due to the elastic force of elastic member 15.

To unfold or fold door curtain 3, the passenger operates door curtain operation switch 23.

When door curtain operation switch 23 is operated, controller 21 does not apply power to the electromagnet 14 because clutch gear is already meshed with door curtain operating gear 18. Controller 21 applies power to the drive motor 12. Controller 21 also determines the rotational direction of drive motor 12 based on the input signal received from door curtain operation switch 23.

When drive motor 12 is operated, the rotational force of drive motor 12 is transferred through clutch gear 13 to rotate door curtain operating gear 18. When the door curtain operating gear 18 rotates, door curtain 3 is operated by door curtain operating wire 19 wound around door curtain operating gear 18.

Controller 21 rotates drive motor 12 during the operation of door curtain operation switch 23, and when the operation of door curtain operation switch 23 is stopped, controller 21 ends the supply of power to drive motor 12.

In contrast, FIG. 3 illustrates a case in which the passenger operates window glass operation switch 22.

When window glass operation switch 22 is operated, controller 21 first applies power to electromagnet 14. When power is applied to electromagnet 14, electromagnet 14 is magnetized causing clutch gear 13 to move toward electromagnet 14. When clutch gear 13 moves toward electromagnet 14, clutch gear 13 is released from door curtain operating gear 18, and is meshed with window glass operating gear 16. In this case, because the attraction force by which electromagnet 14 pulls clutch gear 13 exceeds the elastic force created by the elastic member 15 that acts in the opposite direction of the pull of electromagnet 14, clutch gear 13 moves away from the door curtain operating gear 18 and towards window glass operating gear 16.

After clutch gear 13 is meshed with window glass operating gear 16, controller 21 applies power to drive motor 12 to rotate drive motor 12. When drive motor 12 rotates, the rotational force of drive motor 12 is transferred through clutch gear 13 to rotate window glass operating gear 16.

When window glass operating gear 16 rotates, window glass 2 is raised or lowered by window glass operating wire 17 wound around window glass operating gear 16. Controller 21 determines the rotational direction of drive motor 12 based on the input signal received from window glass operation switch 22, i.e., based on whether the signal is to raise or to lower window glass 2.

Controller 21 rotates drive motor 12 while maintaining magnetization of the electromagnet 14 during the operation of window glass operation switch 22; when the operation of the window glass operation switch 22 is stopped, controller 21 ends the supply of power to electromagnet 14 and drive motor 12.

Figure 4:
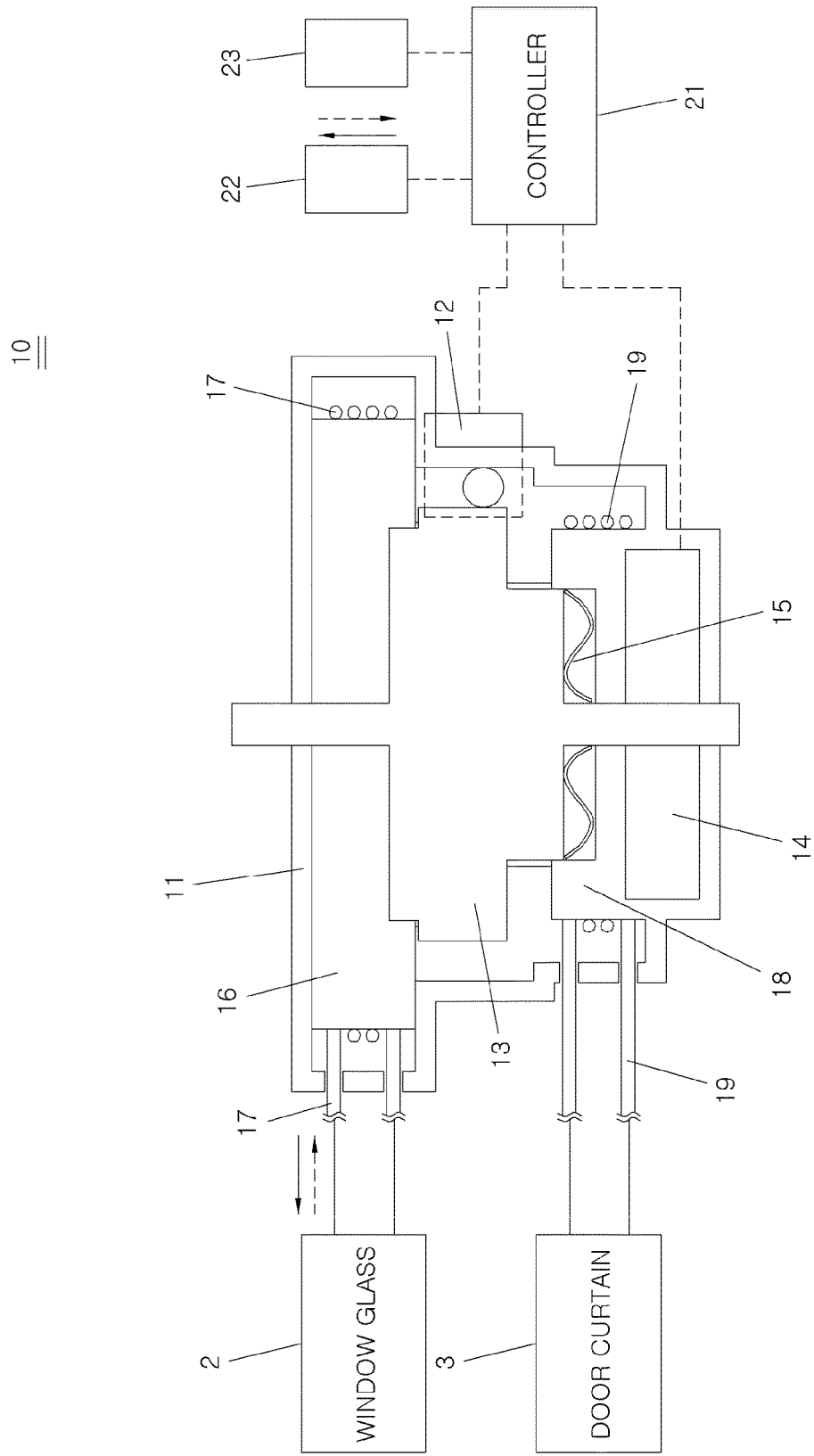
FIG. 4 is a cross-sectional view illustrating operation of a window glass using an example embodiment of an integrated operating apparatus for a window glass and a door curtain.

FIGS. 4 and 5 illustrate an integrated operating apparatus for a window glass and a door curtain in accordance with another example embodiment.

According to the present embodiment, in the integrated operating apparatus for a window glass and a door curtain, the positions of the electromagnet 14 and the elastic member 15 are changed, and accordingly, clutch gear 13 is meshed with window glass operating gear 16 due to the force of elastic member 15 when power is not applied to electromagnet 14. Other configurations are the same as the foregoing embodiment described above, thus a detailed description therefor will be omitted.

According to the present embodiment, because clutch gear 13 is meshed with window glass operating gear 16 when the electromagnet 14 is not magnetized, when the passenger operates window glass operation switch 22, controller 21 does not magnetize electromagnet 14 but instead directly rotates drive motor 12 in the appropriate direction to raise or lower window glass 2.

When a passenger operated door curtain operation switch 23, controller 21 applies power to electromagnet 14, which is then magnetized and pulls clutch gear 13 from window glass operating gear 16 so that clutch gear 13 becomes meshed with door curtain operating gear 18. Thereafter, controller 21 rotates drive motor 12 in an appropriate direction to fold or unfold door curtain 3.

According to the integrated operating apparatus for a window glass and a door curtain and the operating system for a window glass and a door curtain in accordance with the present disclosure, because the window glass and the door curtain of the door may be operated by a single apparatus, it is possible to facilitate installation in the narrow space in the door.

Further, because the number of components is decreased, ease of assembly is improved, manufacturing costs are decreased, and the weight of the vehicle is decreased.

What is claimed is:

1. An integrated operating apparatus for a window glass and a door curtain, comprising:
    a housing;
    a drive motor installed in the housing;
    a window glass operating gear installed in the housing;
    a window glass operating wire wound around the window glass operating gear;
    a door curtain operating gear installed in the housing and spaced apart from the window glass operating gear;
    a door curtain operating wire wound around the door curtain operating gear;
    a clutch gear meshed with the drive motor and slidable to be alternatively meshed with any one of the window glass operating gear and the door curtain operating gear; and
    a gear changer allowing the clutch gear to be meshed with any one of the window glass operating gear and the door curtain operating gear.

2. The integrated operating apparatus of claim 1, wherein the gear changer comprises an elastic member that elastically supports the clutch gear so that the clutch gear is meshed with one of the window glass operating gear and the door curtain operating gear.

3. The integrated operating apparatus of claim 2, wherein the gear changer further comprises an electromagnet that moves the clutch gear in a direction opposite to a direction in which an elastic force of the elastic member is applied.

4. The integrated operating apparatus of claim 3, wherein the elastic member is installed between the window glass operating gear and the clutch gear, and the elastic member elastically supports the clutch gear so that the clutch gear is meshed with the door curtain operating gear in an at rest state.

5. The integrated operating apparatus of claim 4, wherein when power is applied, the electromagnet operates the clutch gear so that the clutch gear is meshed with the window glass operating gear.

6. The integrated operating apparatus of claim 3, wherein the elastic member is installed between the door curtain operating gear and the clutch gear, and the elastic member elastically supports the clutch gear so that the clutch gear is meshed with the window glass operating gear in an at rest state.

7. The integrated operating apparatus of claim 6, wherein when power is applied, the electromagnet operates the clutch gear so that the clutch gear is meshed with the door curtain operating gear.

8. The integrated operating apparatus of claim 3, wherein an attraction force generated by magnetization of the electromagnet is greater than the elastic force with which the elastic member elastically supports the clutch gear.

9. The integrated operating apparatus of claim 1, wherein the clutch gear is composed of a magnetic metal.

10. The integrated operating apparatus of claim 1, further comprising:
a worm gear having teeth around a circumference installed on an output shaft of the drive motor,
teeth along a circumference of the clutch gear,
and wherein the teeth of the worm gear and the teeth of the clutch gear are constantly meshed with each other.

11. An operating system for a window glass and a door curtain that are installed in a door of a vehicle, using the operating system comprising:
an integrated operating apparatus for a window glass and a door curtain including a housing, a drive motor installed in the housing; a window glass operating gear installed in the housing, a window glass operating wire wound around the window glass operating gear, a door curtain operating gear installed in the housing and spaced apart from the window glass operating gear, a door curtain operating wire wound around the door curtain operating gear, a clutch gear meshed with the drive motor and slidable to be alternatively meshed with one of the window glass operating gear and the door curtain operating gear; and a gear changer allowing the clutch gear to be meshed with any one of the window glass operating gear and the door curtain operating gear;
a window glass operation switch operable by a vehicle passenger;
a door curtain operation switch operable by the vehicle passenger; and
a controller configured to apply power to the gear changer and apply power to the drive motor based on an input signal received from the window glass operation switch or the door curtain operation switch.

12. The operating system of claim 11, wherein the gear changer comprises an elastic member that elastically supports the clutch gear so that the clutch gear is meshed with one of the window glass operating gear and the door curtain operating gear, and wherein the gear changer further comprises an electromagnet that moves the clutch gear in a direction opposite to a direction in which an elastic force of the elastic member is applied.

13. The operating system of claim 12, wherein when the elastic member elastically supports the clutch gear so that the clutch gear is meshed with the door curtain operating gear, and an input signal is received by the controller from the window glass operation switch, the controller magnetizes the electromagnet, allows the clutch gear to be meshed with the window glass operating gear, and then rotates the drive motor.

14. The operating system of claim 12, wherein when the elastic member elastically supports the clutch gear so that the clutch gear is meshed with the door curtain operating gear, and an input signal is received by the controller from the door curtain operation switch, the controller does not magnetize the electromagnet but rotates the drive motor.

15. The operating system of claim 12, wherein when the elastic member elastically supports the clutch gear so that the clutch gear is meshed with the window glass operating gear, and an input signal is received by the controller from the door curtain operation switch, the controller magnetizes the electromagnet, allows the clutch gear to be meshed with the door curtain operating gear, and then rotates the drive motor.

16. The operating system of claim 12, wherein when the elastic member elastically supports the clutch gear so that the clutch gear is meshed with the window glass operating gear, and an input signal is received by the controller from the window glass operation switch, the controller does not magnetize the electromagnet but rotates the drive motor.

17. The operating system of claim 11, wherein the window glass operation switch is operable in a plurality of directions, and the controller determines a rotational direction of the drive motor based on the operating direction of the window glass operation switch.

18. The operating system of claim 11, wherein the door curtain operation switch is operable in a plurality of directions, and the controller determines a rotational direction of the drive motor based on an operating direction of the door curtain operation switch.

* * * * *